United States Patent
Trayer

(10) Patent No.: US 8,548,470 B2
(45) Date of Patent: Oct. 1, 2013

(54) MECHANISM FOR THE CONVEYANCE AND MANAGEMENT OF DEVICE MOBILITY IN AN IMS NETWORK

(75) Inventor: Mark Edward Trayer, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1425 days.

(21) Appl. No.: 11/757,691

(22) Filed: Jun. 4, 2007

(65) Prior Publication Data

US 2008/0020771 A1 Jan. 24, 2008

Related U.S. Application Data

(60) Provisional application No. 60/820,194, filed on Jul. 24, 2006.

(51) Int. Cl.
*H04W 36/00* (2009.01)

(52) U.S. Cl.
USPC ........ 455/436; 455/439; 455/422.1; 455/442; 455/418; 455/432.1; 370/331

(58) Field of Classification Search
USPC ........... 455/418, 432.1, 436, 439, 442, 422.1; 370/331, 352–357
See application file for complete search history.

(56) References Cited

U.S. PATENT DOCUMENTS

| | | | |
|---|---|---|---|
| 2004/0176103 A1* | 9/2004 | Trossen et al. | 455/456.3 |
| 2004/0203732 A1* | 10/2004 | Brusilovsky et al. | 455/426.1 |
| 2004/0260819 A1* | 12/2004 | Trossen | 709/229 |
| 2005/0021976 A1* | 1/2005 | Trossen | 713/182 |
| 2005/0243870 A1* | 11/2005 | Balogh et al. | 370/522 |
| 2005/0245261 A1* | 11/2005 | Ejzak | 455/436 |
| 2006/0111112 A1* | 5/2006 | Maveddat | 455/439 |
| 2006/0116127 A1* | 6/2006 | Wilhoite et al. | 455/442 |
| 2006/0121916 A1* | 6/2006 | Aborn et al. | 455/456.5 |
| 2006/0205436 A1* | 9/2006 | Liu et al. | 455/560 |
| 2006/0221837 A1* | 10/2006 | Gardner et al. | 370/241 |
| 2006/0256750 A1* | 11/2006 | Van Bemmel | 370/331 |
| 2006/0256752 A1* | 11/2006 | Svensson et al. | 370/331 |
| 2006/0276192 A1* | 12/2006 | Dutta et al. | 455/436 |
| 2007/0072605 A1* | 3/2007 | Poczo | 455/432.2 |
| 2007/0076696 A1* | 4/2007 | An et al. | 370/352 |
| 2007/0123259 A1* | 5/2007 | Huang et al. | 455/436 |
| 2007/0153770 A1* | 7/2007 | Goyal et al. | 370/352 |
| 2007/0159976 A1* | 7/2007 | Dekeyzer et al. | 370/236 |
| 2007/0213058 A1* | 9/2007 | Shaheen | 455/436 |
| 2007/0217366 A1* | 9/2007 | Sagi et al. | 370/331 |
| 2007/0238466 A1* | 10/2007 | Buckley et al. | 455/445 |
| 2007/0238467 A1* | 10/2007 | Buckley et al. | 455/445 |
| 2007/0238468 A1* | 10/2007 | Buckley et al. | 455/445 |
| 2007/0280264 A1* | 12/2007 | Milton et al. | 370/395.31 |
| 2007/0280453 A1* | 12/2007 | Kelley et al. | 379/201.01 |
| 2008/0032695 A1* | 2/2008 | Zhu et al. | 455/442 |
| 2009/0170519 A1* | 7/2009 | Wilhoite et al. | 455/436 |
| 2009/0303962 A1* | 12/2009 | Jokikyyny et al. | 370/331 |

* cited by examiner

*Primary Examiner* — Kamran Afshar
*Assistant Examiner* — Mong-Thuy Tran

(57) ABSTRACT

A network element is disclosed. The network element has a processor programmed to promote sending an event mechanism to promote a handoff between disparate telecommunications networks. The event mechanism comprises a mobility event comprising a mobility information element and a mobility state element. The mobility information element comprises a type element and a mobility parameters element.

20 Claims, 8 Drawing Sheets

```xml
<?xml version="1.0" encoding="UTF-8"?>
<xs:schema xmlns:xs="http://www.w3.org/2001/XMLSchema" xmlns:tns="urn:samsung:xml:ns:mobility-event" targetNamespace="urn:samsung:xml:ns:mobility-event"
elementFormDefault="qualified" attributeFormDefault="unqualified">
    <xs:element name="mobility-event">
        <xs:complexType>
            <xs:sequence>
                <xs:element ref="tns:mobility-info"/>
                <xs:element ref="tns:mobility-state" minOccurs="0"/>
                <xs:any namespace="##other" processContents="lax" minOccurs="0" maxOccurs="unbounded"/>
            </xs:sequence>
        </xs:complexType>
    </xs:element>
    <xs:element name="mobility-info">
        <xs:complexType>
            <xs:sequence>
                <xs:element name="type" type="tns:mobility-event-type"/>
                <xs:element ref="tns:mobility-parms" minOccurs="0"/>
            </xs:sequence>
        </xs:complexType>
    </xs:element>
    <xs:simpleType name="mobility-event-type">
        <xs:restriction base="xs:string">
            <xs:enumeration value="network-mobility-request"/>
            <xs:enumeration value="device-mobility-request"/>
            <xs:enumeration value="device-mobility-confirm"/>
            <xs:enumeration value="device-mobility-deny"/>
        </xs:restriction>
    </xs:simpleType>
    <xs:element name="mobility-parms">
        <xs:complexType>
            <xs:sequence>
                <xs:element name="cell-id" type="xs:nonNegativeInteger"/>
                <xs:element name="ch-id" type="xs:nonNegativeInteger"/>
                <xs:any namespace="##other" processContents="lax" minOccurs="0" maxOccurs="unbounded"/>
            </xs:sequence>
        </xs:complexType>
    </xs:element>
    <xs:element name="mobility-state">
        <xs:simpleType>
            <xs:restriction base="xs:string">
                <xs:enumeration value="handoff-init"/>
                <xs:enumeration value="handoff-confirm"/>
                <xs:enumeration value="handoff-reject"/>
            </xs:restriction>
        </xs:simpleType>
    </xs:element>
</xs:schema>
```

Figure 6

MECHANISM FOR THE CONVEYANCE AND MANAGEMENT OF DEVICE MOBILITY IN AN IMS NETWORK

CROSS-REFERENCE TO RELATED APPLICATIONS

This application claims priority to U.S. Provisional Patent Application No. 60/820,194, entitled "Mechanism for the Conveyance and Management of Device Mobility in an IMS Network", filed on Jul. 24, 2006, by Mark Edward Trayer, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Easily transportable devices with wireless telecommunications capabilities, such as mobile telephones, personal digital assistants, handheld computers, and similar devices, will be referred to herein as mobile devices or mobile stations. A communications connection between two mobile devices can be referred to as a call or a session. Some mobile devices communicate in a circuit switched mode, wherein a dedicated communication path exists between two devices. For the duration of a call or session, all data exchanged between the two devices travels along the single path.

Some mobile devices also have the capability to communicate in a packet switched mode. In packet switching, a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. In particular, the IP Multimedia Subsystem (IMS) is a packet switched technology that allows multimedia content to be wirelessly transmitted between mobile devices. The term IMS will be used herein to refer to any packet switched network or technology.

SUMMARY

In one embodiment, a network element is provided. The network element has a processor programmed to promote sending an event mechanism to promote a handoff between disparate telecommunications networks. The event mechanism comprises a mobility event comprising a mobility information element and a mobility state element. The mobility information element comprises a type element and a mobility parameters element.

In another embodiment, a system to promote handoff between networks is provided. The system comprises a circuit switched network and a packet switched network. An event mechanism promotes a handoff between the circuit switched network and the packet switched network. The event mechanism comprises a mobility event comprising a mobility information element and a mobility state element. The mobility information element comprises a type element and a mobility parameters element.

In another embodiment, a method for handing a call off from a first telecommunications network to a second telecommunications network is provided. The method comprises sending a Session Initiation Protocol Notify message containing an event mechanism operable to promote handing the call off.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a listing of XML code for a device mobility event according to an embodiment of the disclosure.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Some mobile devices may be capable of operating in either a circuit switched mode or an IMS mode. As a user of such a device travels, the device might move from an area served by a circuit switched network to an area served by an IMS network or from an area served by an IMS network to an area served by a circuit switched network. When a transition from one service area to another occurs, a handoff may need to take place to transfer a call from one type of network to another. Current IMS-based messages, such as Session Initiation Protocol (SIP) messages, cannot be used for communication between circuit switching-based components, and therefore are inadequate for use in handoffs from one type of network to another.

In an embodiment, a new SIP event mechanism is defined with a new event type that can be referred to as 'mobility-event'. In an embodiment, mobility-event has a payload body defined in the extensible markup language (XML) that carries sufficient information to enable a handoff from one type of network to another. More specifically, 'mobility-event' might be a new event type for the SIP Notify message. In other embodiments, messaging protocols other than SIP could be used and languages other than XML could be used but, for ease of reference, the messaging protocol and the language for the event mechanism will be referred to herein as SIP and XML.

Figure 1A:
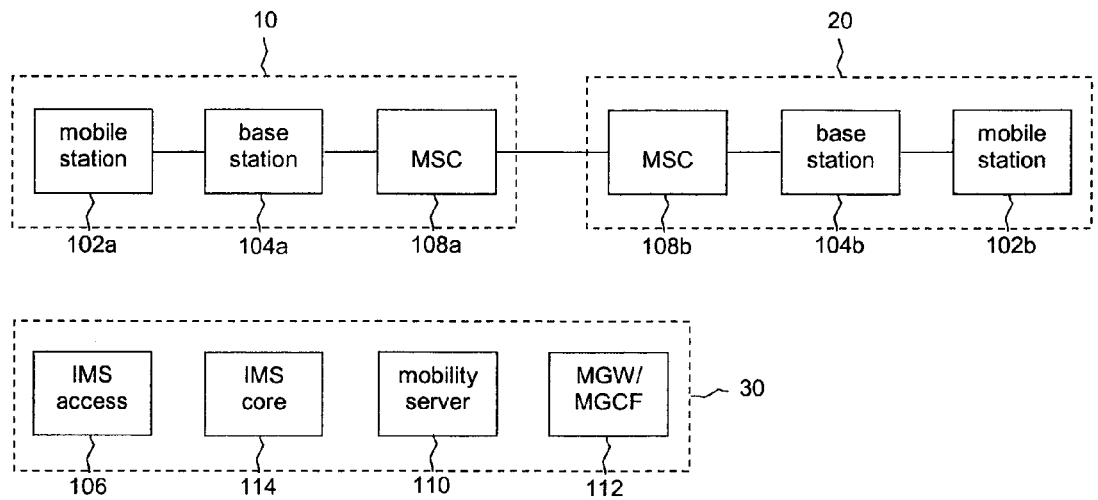
FIGS. 1a and 1b are block diagrams of components in a circuit switched network and an IMS network according to an embodiment of the disclosure.
Figure 1B:
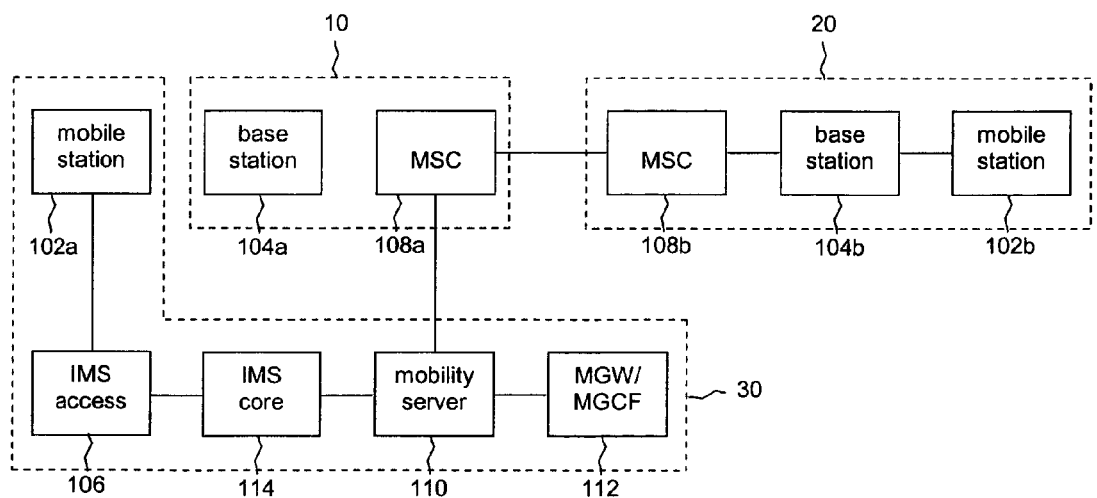

FIGS. 1a and 1b illustrate a plurality of networks that could be involved in the handoff of a call from one type of network to another. In FIG. 1a, a first circuit switched network 10 is capable of communicating with a second circuit switched network 20. A first mobile station 102a in the first circuit switched network 10 can communicate wirelessly with a first base station 104a in the first circuit switched network 10. The first base station 104a can communicate wirelessly with a first mobile switching center (MSC) 108a in the first circuit switched network 10. The first MSC 108a in the first circuit switched network 10 can communicate wirelessly with a second MSC 108b in the second circuit switched network 20. The second MSC 108b can communicate wirelessly with a second base station 104b, which can communicate wirelessly with a second mobile station 102b.

One of skill in the art will recognize that a plurality of components may actually be present in the circuit switched networks 10 and 20 where the base stations 104 are shown. For example, a communications tower, a base transceiver station (BTS), a base station controller (BSC), and other components may be present. As used herein, the term "base station" will refer to any collection of components through which a mobile station can communicate with a mobile switching center.

In FIG. 1a, the mobile stations 102 communicate with one another via the first circuit switched network 10 and the second circuit switched network 20. An IMS network 30 may be outside the areas served by the first circuit switched network 10 and the second circuit switched network 20.

In FIG. 1b, the first mobile station 102a has roamed from the first circuit switched network 10 into the IMS network 30 and a handoff has occurred from the first circuit switched network 10 to the IMS network 30. In an embodiment, the first mobile station 102a now communicates with an IMS access component 106, which can be considered to be a base station that is capable of communicating via the SIP protocol. The IMS access component 106 then communicates with an IMS core component 114. The IMS core component 114 then communicates with a mobility server 110, which can be considered to be a softswitch that promotes communication between IMS networks and circuit switched networks. The mobility server 110 then communicates with the first MSC 108a in the first circuit switched network 10. Communication between the first MSC 108a and the second mobile station 102b can then occur as described above so that uninterrupted communication can continue between the first mobile station 102a and the second mobile station 102b.

Figure 2:
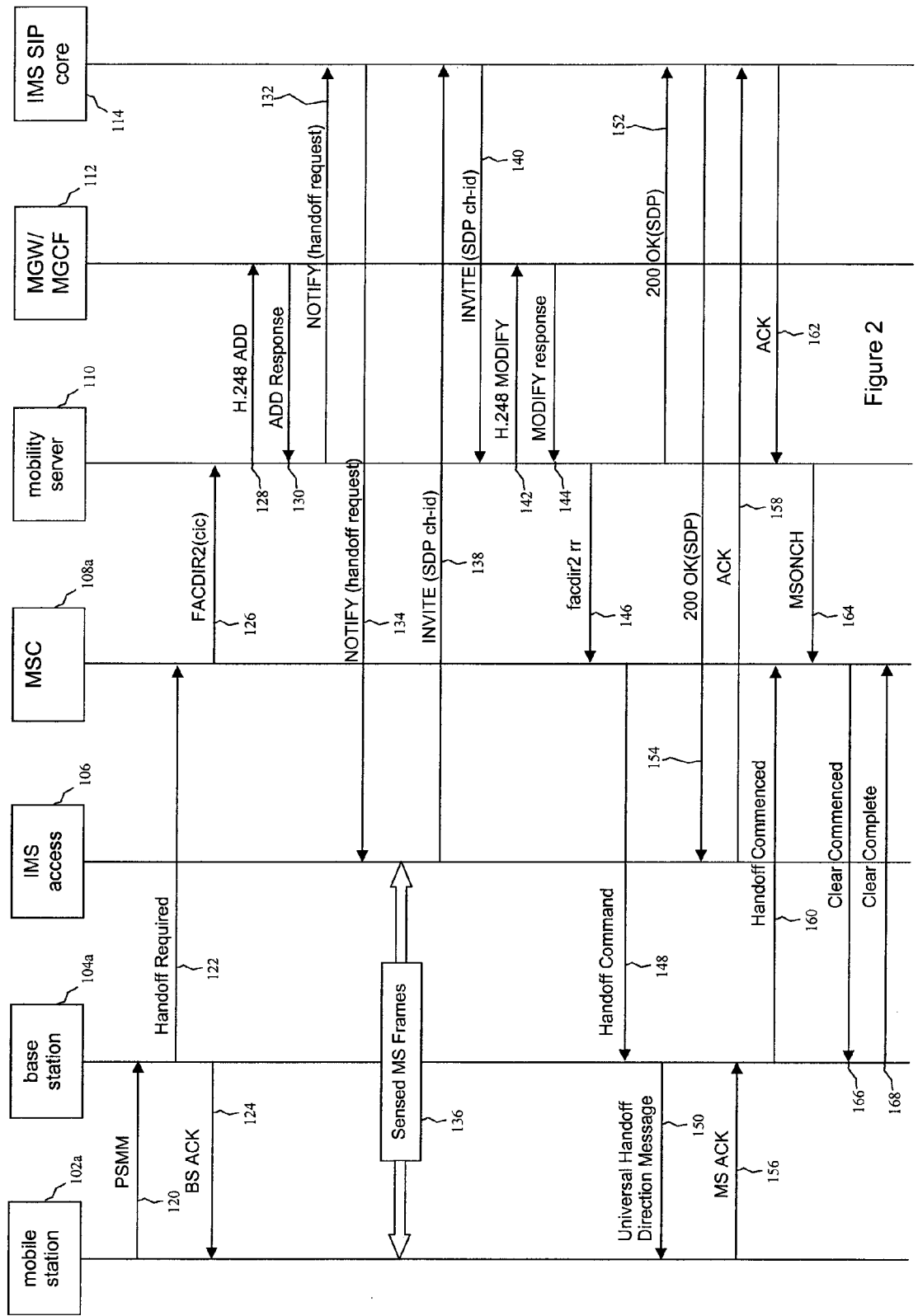
FIG. 2 is a call flow diagram according to an embodiment of the disclosure.

FIG. 2 is a call flow diagram illustrating embodiments of messages that might be exchanged between the components of FIGS. 1a and 1b when the handoff depicted in FIGS. 1a and 1b occurs. At event 120, the mobile station 102a sends a pilot strength measurement message to the base station 104a. The pilot strength measurement message informs the base station 104a that the mobile station 102a has found a network with a greater signal strength than the mobile station's current network. More specifically, the signal strength of the IMS network 30 might be greater than the signal strength of the first circuit switched network 10 and therefore the mobile station 102a might request to move from the first circuit switched network 10 to the IMS network 30.

Upon receiving the pilot strength measurement message, the base station 104a sends a handoff required message, at event 122, to the MSC 108a. The handoff required message informs the MSC 108a that the mobile station 102a has requested to move to another network and identifies the network to which the mobile station 102a wishes to move. At event 124, the base station 104a also sends an acknowledgement message to the mobile station 102a confirming that the handoff required message has been sent.

At event 126, the MSC 108a sends a facilities directive 2 circuit identity code (FACDIR2(cic)) message to the mobility server 110. This message requests the mobility server 110 to initiate a handoff forward and to allocate a circuit to which the call is to be transferred. At event 128, the mobility server 110 sends an H.248 ADD message to a media gateway/media gateway control function (MGW/MGCF) 112 in the IMS network 30 requesting a circuit in the IMS network 30. As is well known in the art, a media gateway is an intermediary component between two disparate technologies that can typically handle both the media portion and the signaling portion of a wireless call. A media gateway control function performs control tasks for the media gateway. The media gateway and the media gateway control function will be treated herein as a single component and will be referred to as an MGW/MGCF. The MGW/MGCF 112, at event 130, responds to the mobility server 110 with an ADD response message stating that the circuit has been provided.

At event 132, the mobility server 110 sends a SIP Notify message containing a handoff request to the IMS SIP core 114. At event 134, the IMS SIP core 114 sends a SIP Notify message containing the handoff request to the IMS access component 106. The event mechanism that enables handoffs between different types of networks can be placed in these SIP Notify messages. Details of the event mechanism will be provided below. In an embodiment, the IMS SIP core 114 and the IMS access component 106 subscribe to these Notify messages prior to the Notify messages being sent so that the IMS SIP core 114 and the IMS access component 106 will receive the Notify messages as needed.

At event 136, the IMS access component 106 senses mobile station frames being transmitted by the mobile station 102a and thus becomes aware of the presence of the mobile station 102a. Then, at event 138, the IMS access component 106 sends a SIP Invite message with a session description parameter (SDP) containing a channel identifier (ch-id) to the IMS SIP core 114. At event 140, the IMS SIP core 114 responds with a SIP Invite (SDP ch-id) message to the mobility server 110. At event 142, the mobility server 110 sends an H.248 MODIFY message to the MGW/MGCF 112 requesting that the IMS circuit be modified. The MGW/MGCF 112, at event 144, responds to the mobility server 110 with an ADD response message stating that the circuit has been modified. At event 146, the mobility server 110 sends a FACDIR2 return result (rr) message to the MSC 108a.

At event 148, the MSC 108a sends a handoff command message to the base station 104a informing the base station 104a that the handoff to the IMS network 30 can commence. At event 150, the base station 104a sends a universal handoff direction message to the mobile station 102a informing the mobile station 102a that the handoff can commence. At event 152, the mobility server 110 sends a SIP 200 OK(SDP) message to the IMS SIP core 114 acknowledging receipt of the Invite message sent at event 140. At event 154, the IMS SIP core 114 sends the IMS access component 106 a SIP 200 OK(SDP) message acknowledging receipt of the Notify message sent at event 134. At event 156, the mobile station 102*a* sends an acknowledgement message to the base station 104*a* acknowledging the universal handoff direction message and, at event 158, the IMS access component 106 sends an acknowledgement message to the IMS SIP core 114 acknowledging the 200 OK message of event 154.

At event 160, the base station 104*a* informs the MSC 108*a* that the handoff has commenced and, at event 162, the IMS SIP core 114 acknowledges to the mobility server 110 that the handoff has commenced. At event 164, the mobility server 110 sends a mobile station on channel (MSONCH) message to the MSC 108*a* informing the MSC 108*a* that the call has been handed over to the IMS network 30. At event 166, the MSC 108*a* sends the base station 104*a* a clear commenced message informing the base station 104*a* that the call is being cleared in the first circuit switched network 10. At event 168, the base station 104*a* informs the MSC 108*a* that the clearing of the call in the first circuit switched network 10 is complete.

Figure 3A:
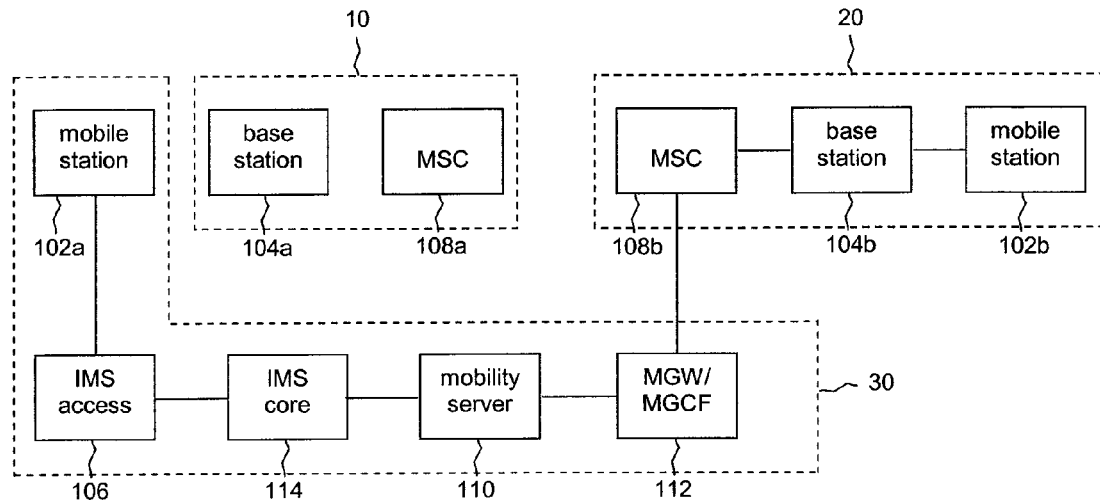
FIGS. 3a and 3b are block diagrams of components in a circuit switched network and an IMS network according to another embodiment of the disclosure.
Figure 3B:
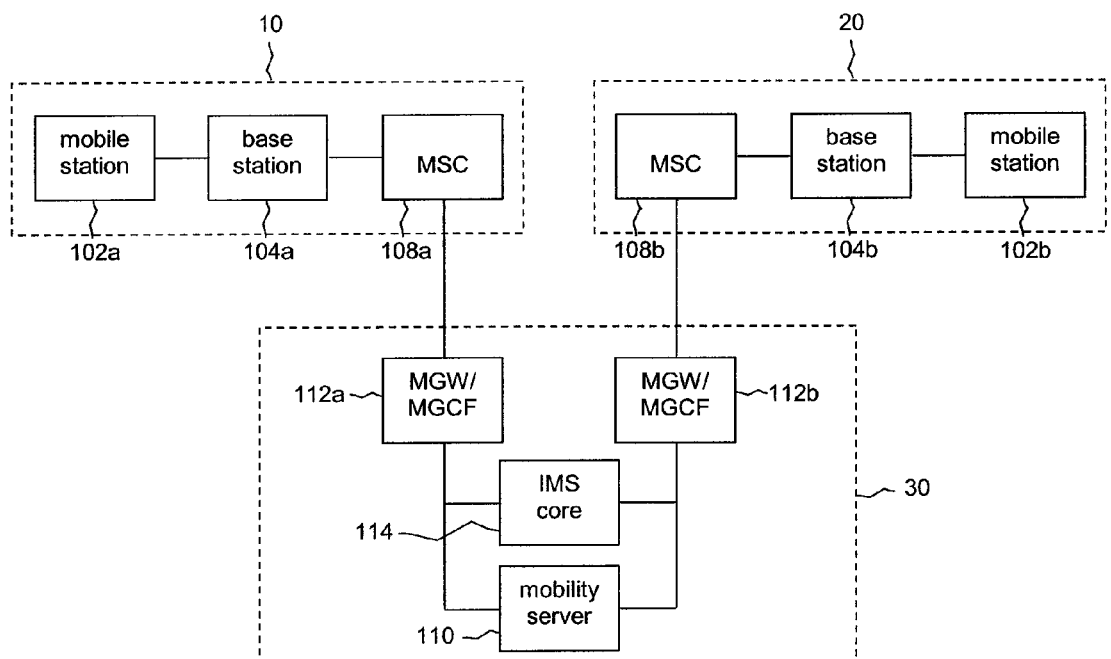
Figure 4:
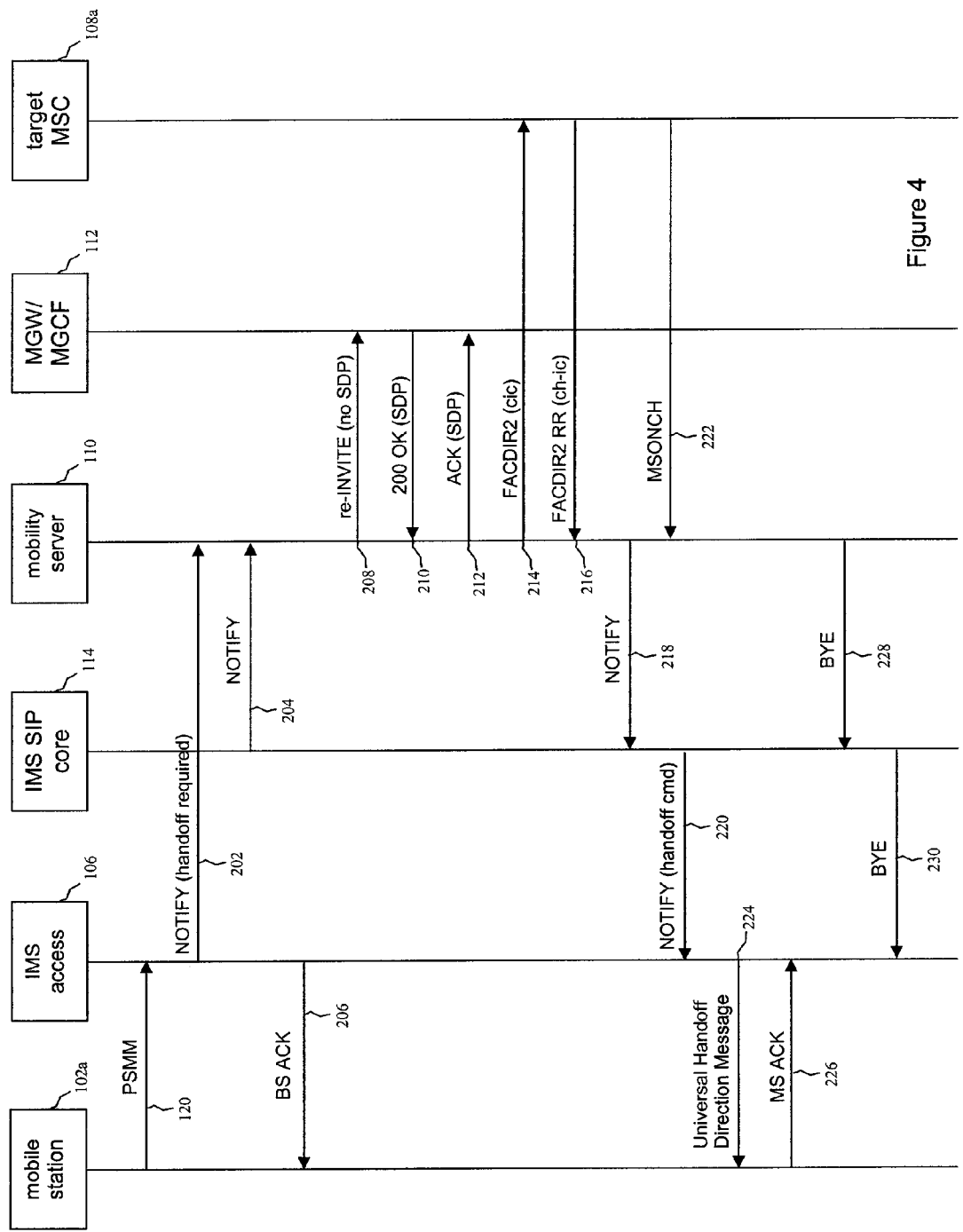
FIG. 4 is a call flow diagram according to another embodiment of the disclosure.

The above discussion and related drawings describe a scenario where a mobile device roams from a circuit switched network into an IMS network. Similar considerations can apply to the situation where a mobile device roams from an IMS network into a circuit switched network. FIGS. 3*a*, 3*b*, and 4 depict such a scenario.

In FIG. 3*a*, the first mobile station 102*a* is in the IMS network 30 as described above and is in communication with the second mobile station 102*b*, which is in the second circuit switched network 20. That is, the first mobile station 102*a* communicates with the IMS access component 106, which communicates with the IMS core 114, which communicates with the mobility server 110, which communicates with the MGW/MGCF 112. The MGW/MGCF 112 in the IMS network 30 then communicates with the second MSC 108*b* in the second circuit switched network 20 and the second MSC 108*b* communicates with the second base station 104*b*, which communicates with the second mobile station 102*b*.

In FIG. 3*b*, the first mobile station 102*a* has roamed into the first circuit switched network 10 and a handoff of the first mobile station 102*a* to the first circuit switched network 10 has occurred. The first mobile station 102*a* now communicates with the first base station 104*a*, which communicates with the first MSC 108*a*. The first MSC 108*a* then communicates with a first MGW/MGCF 112*a* in the IMS network 30. The first MGW/MGCF 112*a* communicates, via the IMS core 114 and the mobility server 110, with a second MGW/MGCF 112*b* in the IMS network 30. The second MGW/MGCF 112*b* communicates with the second MSC 108*b* in the second circuit switched network, which communicates, via the second base station 104*b*, with the second mobile station 102*b*. The first mobile station 102*a* and the second mobile station 102*b* can thus continue uninterrupted communication after the first mobile station 102*a* has roamed from the IMS network 30 into the first circuit switched network 10.

FIG. 4 is a call flow diagram illustrating embodiments of messages that might be exchanged between the components of FIGS. 3*a* and 3*b* when the handoff depicted in FIGS. 3*a* and 3*b* occurs. At event 120, the mobile station 102*a* sends a pilot strength measurement message similar to the pilot strength measurement message of event 120 in FIG. 2. In this case, however, the pilot strength measurement message is sent to the IMS access component 106 rather than to the base station 104*a*. The pilot strength measurement message informs the IMS access component 106 that the mobile station 102*a* has found a network with a greater signal strength than the mobile station's current network. More specifically, the signal strength of the first circuit switched network 10 might be greater than the signal strength of the IMS network 30 and therefore the mobile station 102*a* might request to move from the IMS network 30 to the first circuit switched network 10.

Upon receiving the pilot strength measurement message, the IMS access component 106, at event 202, sends a SIP Notify message with a handoff required parameter to the mobility server 110. At event 204, the IMS SIP core 114 also sends a SIP Notify message to the mobility server 110. As with the Notify messages shown at events 132 and 134 in FIG. 2, the event mechanism that enables handoffs between different types of networks is placed in the Notify messages at events 202 and 204. Also, as with the Notify messages shown at events 132 and 134 in FIG. 2, the mobility server 110 might subscribe to these Notify messages prior to the Notify messages being sent so that the mobility server 110 will receive the Notify messages as needed.

The Notify message at event 204 carries an identifier for the IMS network from which the mobile station 102*a* has roamed. The mobility server 110 maps this identifier to an identifier for the MSC serving the network into which the mobile station 102*a* has roamed. Specifically, the mobility server 110 maps the identifier for the IMS network 30 to the first MSC 108*a* in the first circuit switched network 10 and uses the identifier of the first MSC 108*a* to identify the circuit needed by the first mobile station 102*a*.

At event 206, the IMS access component 106 sends an acknowledgment message to the mobile station 102*a*, acknowledging the handoff request. At event 208, the mobility server 110 sends a SIP Re-Invite message to the MGW/MGCF 112. The MGW/MGCF 112 responds with a 200 OK message at event 210 and the mobility server 110 responds with an acknowledgment message at event 212. In the steps of events 208, 210, and 212, the mobility server 110 allocates a circuit on the MGW/MGCF 112.

At event 214, the mobility server 110 sends a FACDIR2 message to the target MSC, that is, the MSC 108*a* for the network 10 into which the mobile station 102*a* has roamed. The FACDIR2 message contains the circuit identification code for the circuit that has been allocated. At event 216, the MSC 108*a* sends a FACDIR2 return response message to the mobility server 110. At event 218, the mobility server 110 sends a Notify message to the IMS SIP core 114 stating that a circuit in the first circuit switched network 10 has been allocated.

At event 220, the IMS SIP core 114 sends a Notify message with a handoff command to the IMS access component 106 informing the IMS access component 106 to perform the handoff. At event 222, the MSC 108*a* sends an MSONCH message to the mobility server 110 informing the mobility server 110 that the mobile station 102*a* is on channel in the first circuit switched network 10. At event 224, the IMS access component 106 sends a universal handoff direction message to the mobile station 102*a*. The mobile station 102*a* responds with an acknowledgment at event 226, indicating that the mobile station 102*a* is now associated with the first base station 104*a* in the first circuit switched network 10. At event 228, the mobility server 110 sends a Bye message to the IMS SIP core 114 and, at event 230, the IMS SIP core 114 sends a Bye message to the IMS access component 106, thus disconnecting the call from the IMS network 30.

Figure 5:
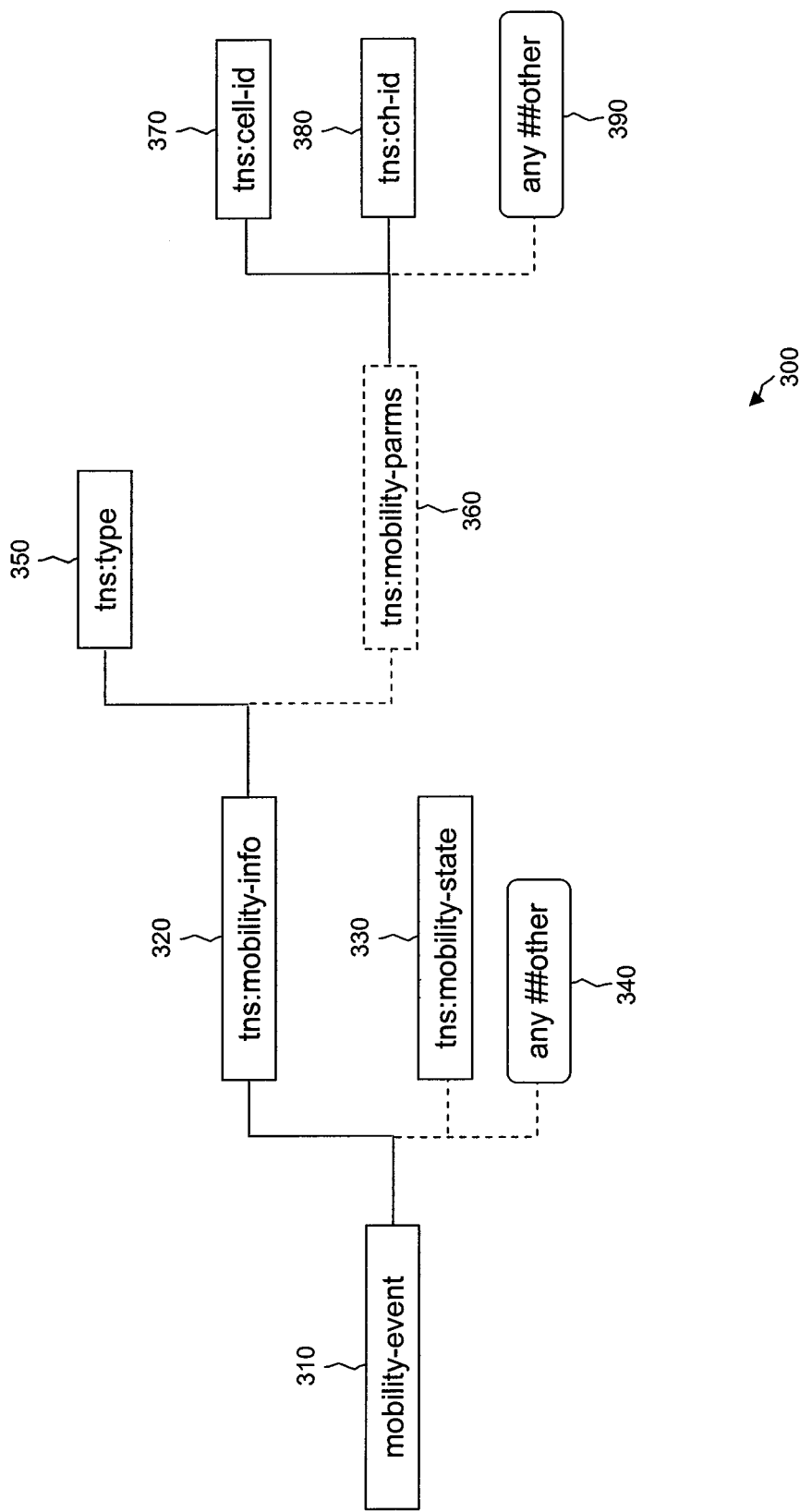
FIG. 5 is a diagram of an XML event structure for a device mobility event according to an embodiment of the disclosure.

As mentioned above, the SIP Notify messages at events in 132 and 134 in FIG. 2 and at events 202 and 204 in FIG. 4 can carry an event mechanism with an event type called mobility-event, which allows calls to be handed off between different types of networks. FIG. 5 illustrates an embodiment of a schema 300 for mobility-event. While this schema 300 is based on XML code, in other embodiments the schema 300 could be based on other languages.

The root element for the schema 300 is mobility-event 310. Elements under mobility-event 310 include mobility-info 320, an optional mobility-state element 330, and another optional element 340 for future use. Elements under mobility-info 320 include type 350 and an optional mobility-parms element 360. Elements under mobility-parms 360 include cell-id 370, channel-id (ch-id) 380, and another optional element 390 for future use. Cell-id 370 is information sent from a mobile device specifying the base station or IMS access component with which the mobile device is in communication. Ch-id 380 is information sent from a network to a mobile device informing the mobile device of a communications channel that the network has allocated for the mobile device.

Values available under mobility-state 330 can include handoff-init, handoff-confirm, and handoff-reject. That is, the mobility-state element 330 handles initiations, confirmations, and rejections of handoffs. Values available under type 350 can include network-mobility-request, device-mobility-request, device-mobility-confirm, and device-mobility-deny. That is, the type element 350 handles requests for network mobility and for device mobility as well as confirmations and denials of device mobility. The network-mobility-request may be equivalent to a FACDIR2 Invoke Component message. The device-mobility-confirm may be equivalent to a FACDIR2 Return Result message. The device-mobility-deny may be equivalent to a FACDIR2 Return Error message. In some embodiments, the mobility event may include an extensibility element to allow for extensions and additions to the event.

FIG. 6 illustrates detailed XML code that can implement the mobility-event schema 300 of FIG. 5. The code of FIG. 6 is provided only as an example and one of skill in the art will recognize that other languages, other syntax, other variables names, and other data structures might promote the handoff of calls between IMS networks and circuit switched networks in a manner similar to the manner in which the code of FIG. 6 accomplishes such handoffs. In an embodiment, the mobility-event implemented by this code is conveyed as an event mechanism in a SIP Notify message as defined by the Internet Engineering Task Force Request for Comments 3261 and Request for Comments 3265.

The systems and methods for device mobility described herein allow mobile devices and telecommunications networks to evolve seamlessly as new technologies emerge. Regardless of the specific components that might make up a circuit switched network or a packet switched network, the mobility-event event mechanism can allow handoffs between such networks to occur. The mobile devices and the interfaces between the mobile devices and the telecommunications networks may not need to adapt to evolving technologies and communication protocols.

Figure 7:
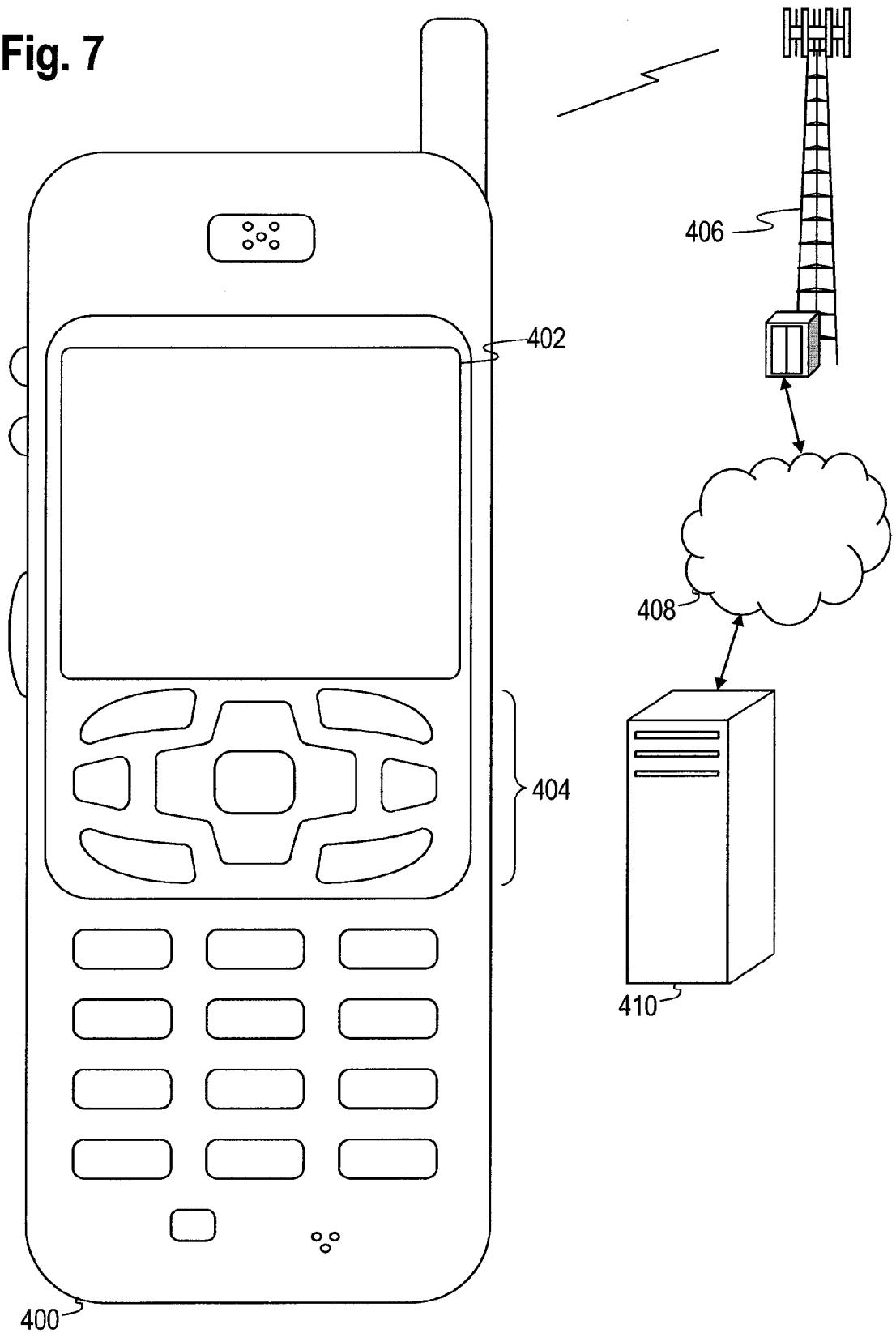
FIG. 7 is a diagram of a wireless communications system including a mobile device operable for some of the various embodiments of the disclosure.

FIG. 7 shows a wireless communications system including a mobile device 400 that may be operable for implementing aspects of the present disclosure, but the present disclosure should not be limited to these implementations. The mobile device 400 may be equivalent to the mobile stations 102 of FIGS. 1-4. Though illustrated as a mobile phone, the mobile device 400 may take various forms including a wireless handset, a pager, a personal digital assistant (PDA), a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the mobile device 400. The mobile device 400 may further execute one or more software or firmware applications in response to user commands. These applications may configure the mobile device 400 to perform various customized functions in response to user interaction.

Among the various applications executable by the mobile device 400 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the mobile device 400 has access to information on various servers, such as a server 410. The server 410 may provide content that may be shown on the display 110.

Figure 8:
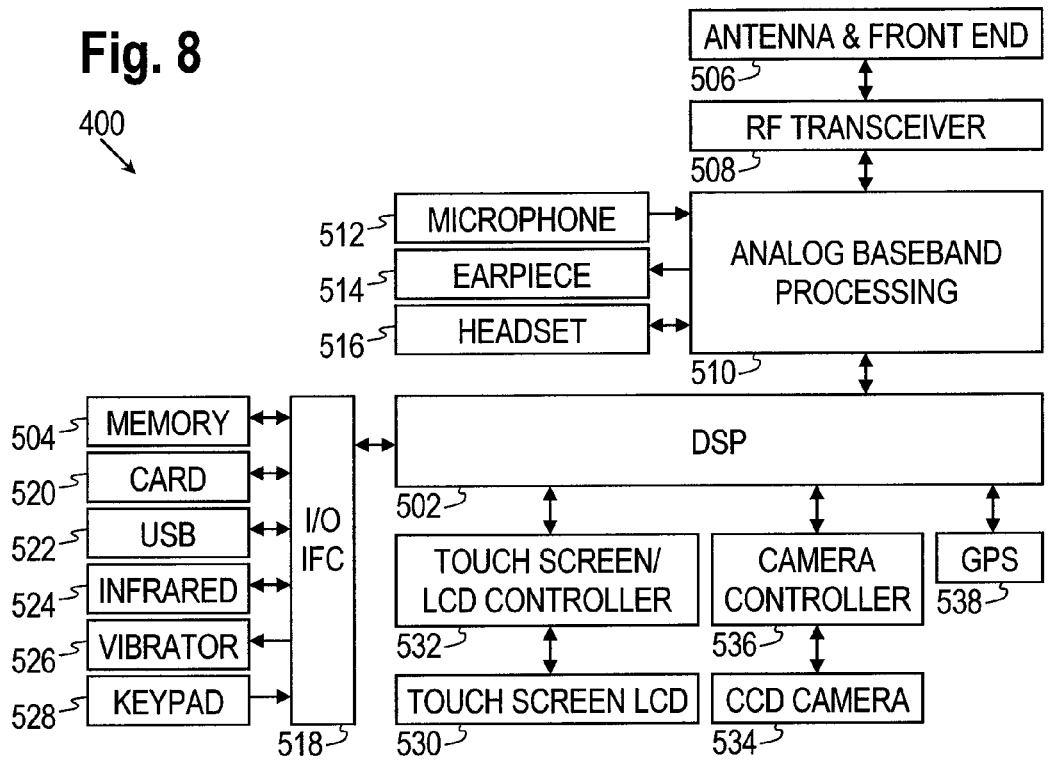
FIG. 8 is a block diagram of a mobile device operable for some of the various embodiments of the disclosure.

FIG. 8 shows a block diagram of the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the mobile device 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. Various other peripherals may also be included to provide additional functions, e.g., radio and television reception.

Figure 9:
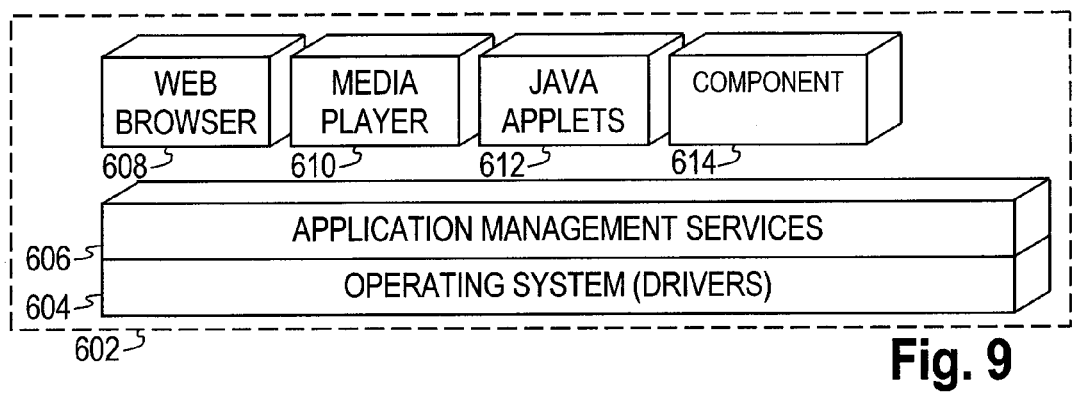
FIG. 9 is a diagram of a software environment that may be implemented on a mobile device operable for some of the various embodiments of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 400. Also shown in FIG. 9 are a web browser application 608, a media player application 610, and Java applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The Java applets 612 configure the mobile device 400 to provide games, utilities, and other functionality. A component 614 might provide functionality related to device mobility.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element configured to send a single message comprising an event mechanism to promote a handoff between disparate telecommunications networks, the event mechanism comprising:
    a mobility event configured to enable the handoff, the mobility event comprising:
        a mobility information element formatted according to a specified schema having a structure that is configured to convey information in both directions between a mobile device and an access node that is in communication with the mobile device, the specified schema comprising:
            a type element; and
            a mobility parameters element including a first element configured to provide information for handover of the mobile device from a circuit switched network to a packet switched network, and a second element configured to provide information for handover of the mobile device from the packet switched network to the circuit switched network; and
        a mobility state element.

2. The network element of claim 1, wherein the mobility parameters element and the mobility state element optionally contain data in the message.

3. The network element of claim 1, wherein the type element is configured to include a request for network mobility, a request for device mobility, confirmations of device mobility, and a denial of device mobility.

4. The network element of claim 1, wherein the mobility state element is configured to include information associated with at least one of an initiation a confirmation, and a rejection of a handoff.

5. The network element of claim 1, wherein the mobility parameters element comprises:
    a call identification element configured to identify a telecommunications network component with which a mobile device is in communication; and
    a channel identification element configured to inform the mobile device of a communications channel that has been allocated for the mobile device.

6. The network element of claim 1, wherein the event mechanism is conveyed in a Session Initiation Protocol Notify message.

7. The network element of claim 1, wherein the packet switched network comprises an IP multimedia subsystem (IMS) network.

8. A system configured to promote handoff between networks comprising:
    a circuit switched network;

a packet switched network; and an event mechanism to promote a handoff of a call between the circuit switched network and the packet switched network, the event mechanism comprising a mobility event comprising:
- a mobility event configured to enable the handoff, the mobility information element formatted according to a specified schema having a structure that is configured to convey information in both directions between a mobile device and an access node that is in communication with the mobile device, the specified schema comprising:
  - a type element; and
  - a mobility parameters element including a first element configured to provide information for handover of the mobile device from a circuit switched network to a packet switched network, and a second element configured to provide information for handover of the mobile device from the packet switched network to the circuit switched network; and
  - a mobility state element.

9. The system of claim 8, wherein the mobility parameters element and the mobility state element optionally include data.

10. The system of claim 8, wherein, when a call is handed off from the circuit switched network to the packet switched network, a Session Initiation Protocol Notify message containing the event mechanism is configured to be sent from a mobility server in the packet switched network to an IP multimedia subsystem (IMS) session initiation protocol (SIP) core in the packet switched network and is sent from the IMS SIP core to an IMS access component in the packet switched network.

11. The system of claim 10, wherein the Notify message is configured to promote the handoff from the circuit switched network to the packet switched network.

12. The system of claim 8, wherein, when a call is handed off from the packet switched network to the circuit switched network, the Notify message is configured to be sent from the IMS access component to the mobility server and is configured to be sent from the IMS SIP core to the mobility server.

13. The system of claim 12, wherein the Notify message is configured to promote the handoff from the packet switched network to the circuit switched network.

14. The system of claim 8, wherein the event mechanism is compliant with Internet Engineering Task Force Request for Comments 3265.

15. A method for handing a call off from a first telecommunications network to a second telecommunications network, the method comprising:
- sending a single Session Initiation Protocol Notify message containing an event mechanism operable to promote handing the call off from the first to the second telecommunications network, the event mechanism formatted according to a specified schema having a structure that is configured to convey information in both directions between a mobile device and an access node that is in communication with the mobile device, the specified schema comprising a mobility parameters element including a first element configured to provide information for handover of the mobile device from a circuit switched network to a packet switched network, and a second element configured to provide information for handover of the mobile device from the packet switched network to the circuit switched network.

16. The method of claim 15, wherein the Notify message is sent upon a receipt by a component in the first telecommunications network of a pilot strength measurement message indicating that a greater signal strength is available in the second telecommunications network.

17. The method of claim 15, wherein, when the first telecommunications network comprises a circuit switched network and the second telecommunications network comprises a packet switched network, sending the Notify message from a mobility server in the packet switched network to an IP multimedia subsystem (IMS) session initiation protocol (SIP) core in the packet switched network and sending the Notify message from the IMS SIP core to an IMS access component in the packet switched network.

18. The method of claim 15, wherein, when the first telecommunications network comprises a packet switched network and the second telecommunications network comprises a circuit switched network, sending the Notify message from the IMS access component to the mobility server and sending the Notify message from the IMS SIP core to the mobility server.

19. The method of claim 15, wherein the event mechanism comprises:
- a mobility information element comprising:
  - a type element, and
  - a mobility state element.

20. The method of claim 19, wherein the mobility state element handles an initiation, a confirmation, and a rejection of a handoff.

* * * * *